Figure 1:
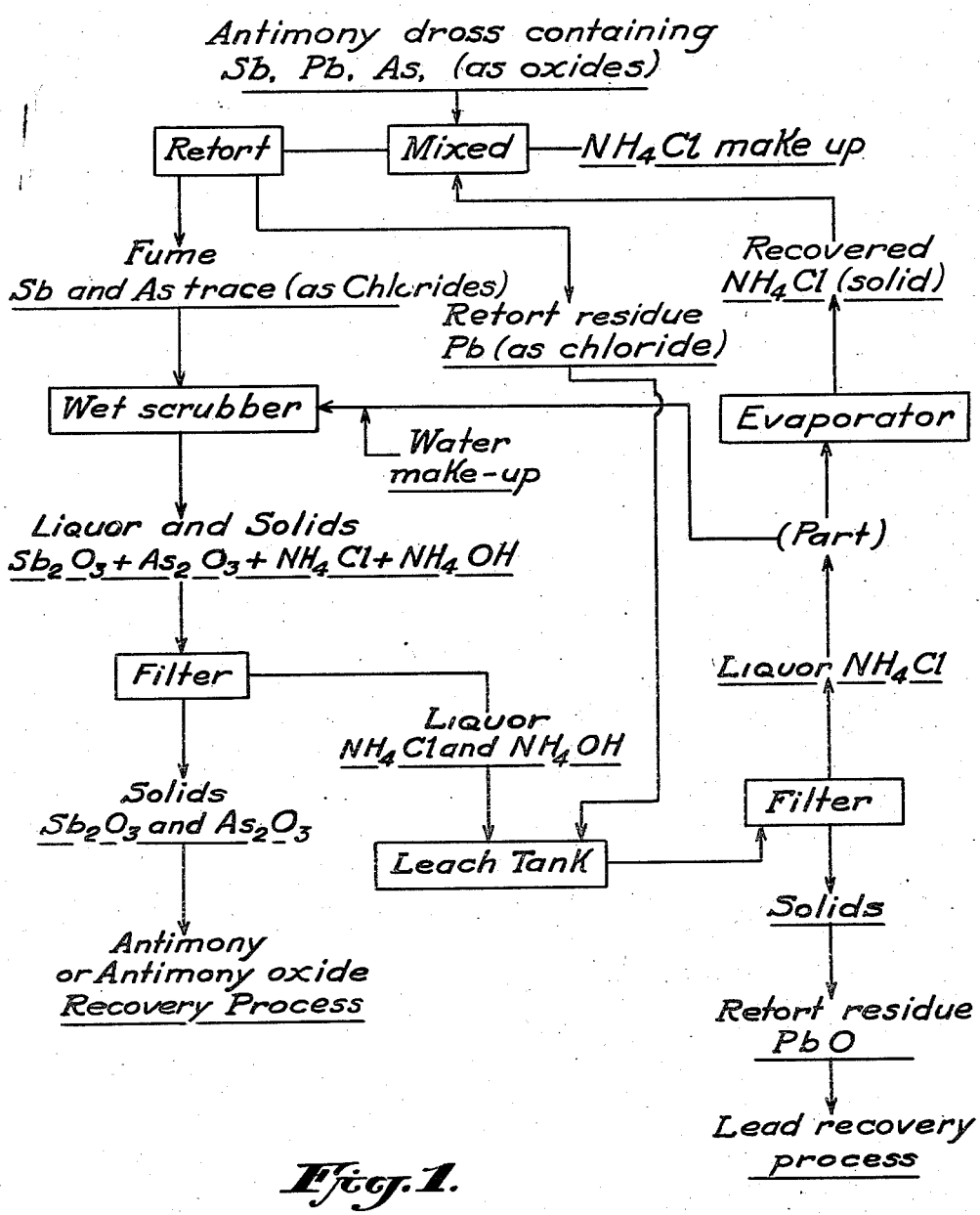

May 28, 1946. T. R. JONES 2,401,001
PROCESS FOR TREATING ANTIMONY DROSSES
Filed July 3, 1943 2 Sheets-Sheet 1

INVENTOR.
THOMAS R. JONES
BY
his ATTORNEYS

UNITED STATES PATENT OFFICE 2,401,001

PROCESS FOR TREATING ANTIMONY DROSSES

Thomas R. Jones, Woodbridge, N. J., assignor to The American Metal Company, Limited, New York, N. Y., a corporation of New York Application July 3, 1943, Serial No. 493,432

11 Claims. (Cl. 75—113)

This invention relates to a process for separating antimony from antimony-lead oxide drosses.

In the treatment of lead-bearing materials and the subsequent refining of the lead by various methods, there are produced numerous by-products. In many processes, drosses or slags are produced in which the major components are lead and antimony in oxide combinations. Besides antimony and lead, these drosses usually contain some arsenic and tin, and also small amounts of bismuth, copper, silver, zinc, iron. They may also contain aluminum, silicon and magnesium.

The principal object of the present invention is to provide a simple, efficient process for the substantial separation of antimony and arsenic, if present, from lead and many other constituents found in such oxide drosses.

In accordance with my invention, in treating these drosses by my process, I may obtain a product which is a highly purified antimony oxide substantially free from lead and other impurities. Such antimony oxide may be used directly, for example, in the enameling business as an opacifier, or the oxide may be reduced to antimony metal and employed in that form. In producing such highly purified antimony oxide by my process, I preferably start with an antimony-lead oxide dross from which substantially all other impurities have been removed. Under such circumstances, it is only necessary to separate the antimony from the lead in order to obtain the highly purified antimony oxide.

On the other hand, I may employ my process to purify drosses which contain one or more of the other metals mentioned above. For example, but without limitation, I may use the process to remove substantially all of the antimony and arsenic, if present, from the dross, which dross may then be employed to produce a solder or other product substantially free from antimony and arsenic.

The invention accordingly consists of a process for separating antimony and arsenic, if present, from an impure dross containing lead and the last-mentioned materials, together with other metallic values, which comprises, combining the dross with an ammonium halide and heating to distill off the antimony compound formed, together with the arsenic compound if arsenic is present in the dross. The antimony (and arsenic) are then recovered.

According to my invention, these antimony-lead oxide materials with or without other metallic components, are treated with ammonium chloride or other ammonium halide and heated in a retort. Fumes containing the antimony and arsenic (together with part of other volatile metallic components) are collected in a wet gas scrubber or similar device, while the lead and other metallic components remain in the retort as a residue.

In carrying out the process using a substantially pure antimony and lead oxide dross, such a dross is obtainable by the practice of known processes. I treat such dross in accordance with my invention preferably as shown on the flow sheet designated as Fig. 1, which with Fig. 2 accompanies this specification and forms part thereof. As shown in Fig. 1, the dross is mixed with ammonium chloride employing approximately of the order of 25% excess over the amount theoretically required to react with all lead, antimony and arsenic present. The materials are preferably mixed dry in ground condition. They are then placed in a retort and heated in the range of about 350° C. to below 950° C., preferably to at least about 500° C. (930° F.) for efficient operation. A fume is formed containing arsenic and antimony as chlorides. This fume is collected in a wet gas scrubber which condenses the gases. The lead remains in the retort as chloride. The antimony trichloride, together with ammonia, are collected in the water of the scrubber where they react to form insoluble antimony trioxide and soluble ammonium chloride. Any arsenic present as chloride also reacts with the ammonia to produce arsenic oxide and ammonium chloride. The liquor and solids thus resulting are filtered. The solids consisting of antimony oxide, together with some arsenic oxide, are then treated by known recovery processes to recover the antimony as oxide or as antimony metal.

The process is preferably conducted cyclically and the filtrate from the liquor and solids mentioned above, which contains ammonium chloride and ammonium hydroxide, passes to a leach tank. Into this leach tank the retort residue consisting substantially of lead as chloride is fed. A reaction occurs whereby lead hydroxide is formed, together with ammonium chloride. The liquor and solids from this reaction are filtered. The solids consisting substantially of lead hydroxide are then passed to the lead-recovery process for the production of litharge or metallic lead. The liquid obtained from the last-mentioned filtering process contains ammonium chloride. Part of this liquor is fed back to the wet scrubber and part of it passes to an evaporator where it is evaporated to recover solid ammonium chloride which is then used for mixing with the original antimony dross prior to placing the mixture in the retort.

It will be noted that the equipment required for the process is comparatively simple, consisting essentially of a retort, a wet gas scrubber, a filter, a leach tank, and an evaporator.

As noted above, I prefer to operate the process at about 500° C., but below 950° C. Lower or higher temperatures may be employed. Ammonium chloride dissociates at about 350° C. and it is important to dissociate it in order to form the chlorides of the metals. In operating with antimony, lead and arsenic, it is possible to effect almost a complete separation of antimony chloride from lead chloride by operating at the temperature mentioned above, namely, about 500° C. This will be apparent from the fact that antimony chloride boils at about 223° C., whereas lead chloride boils at about 950° C. Arsenic trichloride ($AsCl_3$) boils at about 130° C. or 90 degrees lower than antimony chloride and, hence, it distills over with antimony if present. The reaction as indicated below produces ammonia ($NH_3$) and water and when antimony trichloride ($SbCl_3$) passes into the wet scrubber, a reaction occurs whereby antimony oxide ($Sb_2O_3$) is precipitated, as well as ammonium chloride ($NH_4Cl$). The arsenic chloride reacts in the same way as antimony and precipitates as arsenic oxide ($As_2O_3$). There appear to be several chemical reactions involved in my process. The reactions involving dissociation of ammonium chloride, formation of antimony trichloride from antimony oxide, and the re-formation of the antimony oxide in the scrubber, appear to be as follows:

Above 350° C. (665° F.), $NH_4Cl$ decomposes in accordance with the following equation:

$$NH_4Cl = NH_3 + HCl$$

The hydrochloric acid (HCl) then reacts with the antimony oxide thus:

$$Sb_2O_3 + 6HCl = 2SbCl_3 + 3H_2O$$

Combining these two equations, the net reaction becomes:

$$Sb_2O_3 + 6NH_4Cl = 2SbCl_3 + 6NH_3 + 3H_2O$$

The three products of the net reaction fume out of the retort and are caught in the gas scrubber where the precipitation of the antimony oxide and re-forming of the $NH_4Cl$ takes place. The re-formation of $Sb_2O_3$ and $NH_4Cl$ in the scrubber may be explained by the simple reversal of the net reaction above due to the reduction in temperature to below 350° C. as follows:

$$2SbCl_3 + 3H_2O + 6NH_3 = Sb_2O_3 + 6NH_4Cl$$

The course of the reaction may also be explained by the dissolving of ammonia and antimony trichloride in the water of the gas scrubber with the formation of $NH_4OH$ which reacts with the antimony trichloride to cause antimony oxide to precipitate as follows:

$$6NH_4OH + 2SbCl_3 = 6NH_4Cl + Sb_2O_3 + 3H_2O$$

It was found during the experiments made in the development of this process that the reaction with lead oxide (PbO), namely, $$PbO + 2NH_4Cl \rightarrow PbCl_2 + 2NH_3 + H_2O$$

occurs in preference to the reaction between $Sb_2O_3$ and $NH_4Cl$, so that all the lead is converted to chloride with a consumption of $NH_4Cl$ corresponding to the lead present. The $NH_3$ from the lead reaction is caught in the scrubber to form $NH_4OH$ so that the liquor is soon ammoniacal because this ammonia is not converted to $NH_4Cl$ because the corresponding lead chloride remains in the retort.

The flow sheet shown in Fig. 1 describes the process as applied to a dross containing arsenic. As indicated, this arsenic may be removed by known processes from the final antimony oxide obtained in order to secure a pure antimony oxide, if that is required. As an alternative, of course, arsenic can be removed from the bullion from which the dross is made, by a process such as that described in the application of Heberlein et al., Serial No. 433,464, filed March 5, 1942, now Patent No. 2,335,758, Nov. 30, 1943. This process will leave the lead and antimony substantially intact. If a dross formed from such metal is used, the antimony oxide resulting from the practice of my invention will be substantially free from arsenic.

The lead chloride remaining in the retort may be treated in other ways than as indicated in the flow sheet of Fig. 1 if desired. For instance, it may be stirred with zinc to form lead and zinc chloride as marketable products, or may be mixed with crushed limestone and combined with a reducing agent. Upon heating, calcium chloride will be formed and the lead oxide produced will be reduced to metallic lead.

The following are examples of the manner in which I now prefer to practice the process on dross consisting substantially of lead and antimony oxides, together with a small amount of arsenic and with negligible quantities of other metals present. In the examples 1–4 given below, the parts are given by weight.

*Example 1*

To 150 parts of antimony-lead dross containing approximately the following content calculated as metals:

| | Per cent |
|---|---|
| Lead | 50 |
| Antimony | 32.8 |
| Arsenic | 2.33 | and a negligible quantity of other metals, was added 140 parts of dry ammonium chloride ($NH_4Cl$). The quantity of ammonium chloride added is about 25% in excess of the amount theoretically required to react with the lead, antimony and arsenic present. After mixing, the mass was placed in a fire clay retort and heated for about 3½ hours at about 550° C. The gases were passed into a scrubber, where antimony oxide was precipitated out together with arsenic oxide, lead chloride remaining in the retort. The precipitate in the scrubber upon analysis showed the following:

| | Per cent |
|---|---|
| Lead | About 0.1 |
| Antimony oxide | About 88.38 |
| Arsenic oxide | About 6.71 |
| Balance including moisture | 4.81 |

The retort residue showed upon analysis to contain calculated as metals:

| | Per cent |
|---|---|
| Lead | About 68.6 |
| Antimony | About 0.3 |
| Arsenic | About 0.2 |

The filtrate from the scrubber liquor, after removal of the antimony and arsenic oxides, contained ammonia and about 1% of metallic impurity. The filtrate was employed for the treatment of the lead chloride in the retort to produce lead oxide and ammonium chloride. The ammonium chloride was then reused as indicated in the flow sheet of Fig. 1.

Example 2

Another antimony-lead dross was employed in this process containing approximately 44.74% lead, 41.2% antimony and 0.8% arsenic, calculated as metals, with a small amount of other metallic values. Approximately the theoretical proportion of ammonium chloride was mixed dry with the dross, the other conditions of temperature, etc., being substantially the same as in Example 1. The result of the process employing the dross mentioned was to produce a scrubber product having about the following composition:

| | Per cent |
|---|---|
| Lead oxide | Trace |
| Antimony oxide | About 98.14 |
| Arsenic oxide | About 1.41 |

The retort residue contained substantially all of the lead of the original dross.

Figure 2:
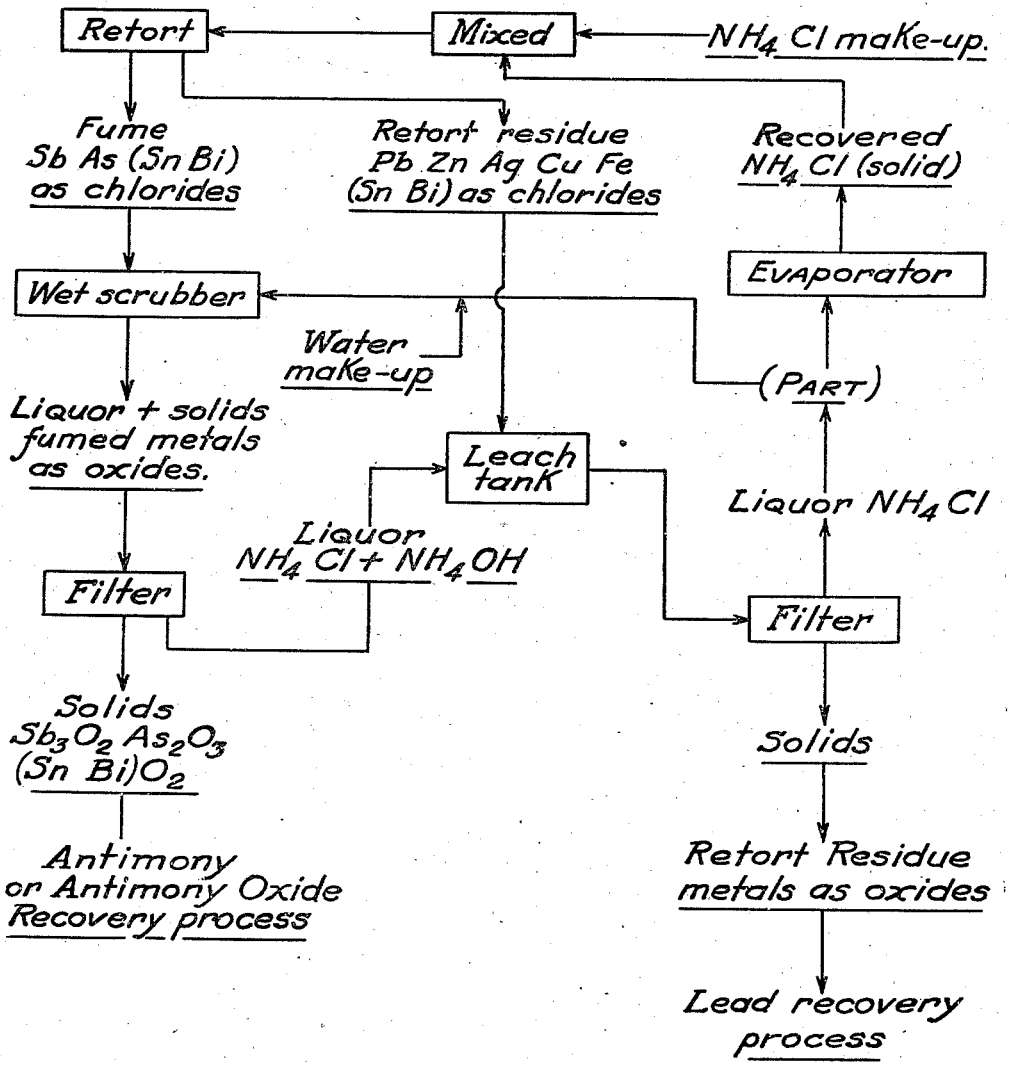

Fig. 2 shows a flow sheet for antimony dross containing not only lead and arsenic, but also other metals as oxides, specifically, tin, bismuth, silver, copper and iron. This flow sheet shows where such metals will be found where one or more are present in appreciable quantity. The procedure for operating with such drosses is substantially the same as heretofore given. Part of the tin and bismuth accompany the antimony and arsenic and are recovered therewith, the remaining metals accompany the lead and are recovered therewith. The process of my invention is particularly useful for the purification of such drosses by removal of antimony and arsenic therefrom substantially completely.

As shown in Fig. 2, the dross is mixed with dry ammonium chloride and placed in the retort and heated as described in connection with the flow sheet of Fig. 1. A fume of antimony, arsenic, tin and bismuth chloride occurs which is collected in the wet scrubber. The liquor and solids, which latter are composed of the fumed metals as oxides, are filtered and the solids consisting of antimony oxide, arsenic oxide, tin and bismuth oxides are recovered. The antimony content may then be later recovered either as the metal or as the antimony oxide by known processes. The filtrate containing ammonium chloride and ammonia then passes to the leach tank into which is then fed the retort residue consisting of chlorides of lead, zinc, silver, copper, iron and the remainder of the tin and bismuth. These chlorides are converted by the ammonia into the corresponding oxides with the production of a further quantity of ammonium chloride. After the reaction, the mixture is filtered and the solids consisting of the oxides of the metals mentioned are recovered. From these solids the lead is recovered by known processes. The filtrate containing ammonium chloride is then passed in part to the wet scrubber and in part to an evaporator. From the latter, solid ammonium chloride is recovered for the make-up with a further quantity of antimony dross.

The following examples, in accordance with the flow sheet of Fig. 2, show the use of the process as applied to a dross consisting principally of oxides of lead, antimony, tin and arsenic. These examples are illustrative and the invention is not to be considered as limited thereto except as indicated in the appended claims.

Example 3

To 150 parts of tin-antimony-lead dross containing approximately the following content calculated as metals:

| | Per cent |
|---|---|
| Lead | 44.20 |
| Tin | 37.76 |
| Antimony | 2.38 |
| Arsenic | 0.61 | and a negligible quantity of other metals, was added 140 parts of dry ammonium chloride (NH₄Cl). The quantity of ammonium chloride added is about 25% in excess of the amount theoretically required to react with the lead, tin, antimony and arsenic present. After mixing, the mass was placed in a fire-clay retort and heated for about 3½ hours at about 455° C. The gases were passed into a scrubber, where antimony oxide was precipitated out together with arsenic oxide and tin oxide, substantially all of the lead and most of the tin remaining as chlorides in the retort. The precipitate in the scrubber upon analysis showed the following calculated as metals:

| | Per cent |
|---|---|
| Lead | Trace |
| Tin | 28.24 |
| Antimony | 28.90 |
| Arsenic | 5.26 |

The retort residues showed on analysis to contain calculated as metals:

| | Per cent |
|---|---|
| Lead | 39 |
| Tin | 26.03 |
| Antimony | Trace |
| Arsenic | Trace |

The filtrate from the scrubber liquor, after removal of the tin, antimony and arsenic oxides, contained substantially no metallic impurity. It was employed for the treatment of the lead chloride in the retort to produce lead oxide, tin oxide, and ammonium chloride. The ammonium chloride was then reused as indicated in the flow sheet of Fig. 2.

Example 4

To 150 parts of tin-antimony-lead dross containing approximately the following content calculated as metals:

| | Per cent |
|---|---|
| Lead | 44.20 |
| Tin | 37.76 |
| Antimony | 2.38 |
| Arsenic | 0.61 | and a negligible quantity of other metals, was added 140 parts of dry ammonium chloride (NH₄Cl). The quantity of ammonium chloride added is about 25% in excess of the amount theoretically required to react with the lead, tin, antimony and arsenic present. After mixing, the mass was placed in a fire-clay retort and heated for about 3½ hours at about 505° C. The gases were passed into a scrubber, where antimony oxide was precipitated out together with arsenic oxide and tin oxide, substantially all of the lead and most of the tin remaining as chlorides in the retort. The precipitate in the scrubber upon analysis showed the following calculated as metals:

| | Per cent |
|---|---|
| Lead | Trace |
| Tin | 49.86 |
| Antimony | 11.28 |
| Arsenic | 2.79 |

The retort residue showed on analysis to contain calculated as metals:

| | Per cent |
|---|---|
| Lead | 41.6 |
| Tin | 33.28 |
| Antimony | Trace |
| Arsenic | Trace |

The filtrate from the scrubber liquor, after removal of the tin, antimony and arsenic oxides, contained substantially no metallic impurity. It was employed for the treatment of the lead chloride in the retort to produce lead oxide, tin oxide and ammonium chloride. The ammonium chloride was then reused as indicated in the flow sheet of Fig. 2.

In carrying out the processes of Examples 3 and 4, it will be noted that some tin passes to the scrubber precipitate. A higher proportion of tin to antimony appears in the scrubber precipitate of Example 4 than in that of Example 3 due to the use of a higher temperature in Example 4. Most of the tin, operating at preferred temperatures, may be held back in the retort residue by the addition, if desired, of phosphoric acid to the retort charge. The phosphorus will then appear with the residue recovered from the retort charge and may be eliminated therefrom by known processes.

The above Examples 1-4 employ ammonium chloride as the ammonium halide for operation of the process. Other halides than ammonium chloride may be employed if desired. Tests indicate that ammonium fluoride operates similarly to the action of ammonium chloride. Results obtained using ammonium bromide are like those obtained with the use of ammonium chloride.

What I claim as new and desire to be secured by Letters Patent is:

1. A process for separating antimony from an impure dross containing antimony and lead which comprises, combining the dross with an ammonium halide, heating to distill the antimony halide from the lead halide together with ammonia and water as a mixed fume at a temperature below the boiling point of the lead halide, and condensing the fume.

2. A process for separating antimony from an impure dross containing antimony and lead as its chief constituents which comprises, combining the dross with ammonium chloride, heating to form antimony chloride, lead chloride, ammonia and water, distilling off the antimony chloride, ammonia and water, as a mixed fume, at a temperature below the boiling point of the lead chloride and condensing the fume.

3. A process for separating antimony from an impure dross containing lead and antimony which comprises, combining the dross with ammonium chloride, heating a mixture of the dross and ammonium chloride to above about 350° C. but below about 950° C., causing antimony to distill off as antimony chloride, together with ammonia and water, condensing the gases whereby a mixture of antimony oxide and ammonium chloride is formed and recovering the antimony oxide.

4. A process for separating antimony from an impure dross containing antimony and lead as its chief constituents which comprises, combining the dross with ammonium chloride, heating in a range of about 350° C. to about 600° C. to form antimony chloride, lead chloride, ammonia and water, and distilling off the antimony chloride, ammonia and water, as a mixed fume, at a temperature below the boiling point of the lead chloride and condensing the fume.

5. A process for treating an antimony dross containing antimony oxide and lead oxide which comprises, mixing ammonium chloride with said dross, heating to change the antimony and lead into chlorides and to cause the antimony chloride to pass off, together with ammonia and other volatile impurities as fume, passing the fume into a wet scrubber, producing antimony oxide together with ammonium compounds and water and recovering the antimony oxide from the ammonium compounds solution.

6. A process for treating an antimony dross containing antimony oxide and lead oxide which comprises, mixing ammonium chloride with said dross, heating to change the antimony and lead into chlorides and to cause the antimony chloride to pass off, together with ammonia and other volatile impurities as fume, passing the fume into a wet scrubber, producing antimony oxide together with ammonium compounds and water, recovering ammonium compounds and using them cyclically in the treatment of further dross.

7. A process for treating an antimony dross containing antimony oxide and lead oxide and other metallic oxide compounds capable of forming chlorides, which comprises, mixing ammonium chloride with said dross, heating to change the antimony and lead and other oxide compounds into chlorides and to cause the antimony chloride to pass off, together with ammonia and other volatile impurities as fume, passing the fume into a wet scrubber, producing antimony oxide together with ammonium chloride and water, taking the unvolatilized lead chloride and other unvolatilized metallic chloride, combining them with the liquor containing ammonium chloride and ammonia to form lead oxide and other oxide by reaction of the ammonia with lead chloride and other metallic chloride, thereby increasing the content of ammonium chloride in the liquor and recovering the lead oxide and other oxide from said liquor.

8. A process for treating an antimony dross containing antimony oxide, lead oxide and other metal oxides capable of forming chlorides, which comprises, mixing ammonium chloride with said dross, heating to change the antimony, lead and other metal oxide into chlorides and to cause the antimony chloride to pass off, together with ammonia and other volatile impurities as fume, passing the fume into a wet scrubber, producing antimony oxide together with ammonium chloride and water, taking the unvolatilized lead chloride and other unvolatilized metallic chloride, combining them with the liquor containing ammonium chloride and ammonia to form lead oxide and other metallic oxide by reaction of the ammonia with lead chloride and other metallic chloride, thereby increasing the content of ammonium chloride in the liquor, evaporating the ammonium chloride solution to recover the ammonium chloride therefrom, and recovering the lead oxide and other oxide from said liquor.

9. A process for treating an antimony dross containing antimony, lead, arsenic and tin which comprises, mixing ammonium chloride with said dross, and heating to change the antimony, lead, arsenic and tin into chlorides and to cause the antimony and arsenic chlorides to pass off substantially completely with ammonia and water as fume and condensing the fume, cleaning the lead chloride substantially undistilled together with some tin chloride.

10. A process for treating an antimony dross containing antimony, lead, arsenic and tin which comprises, mixing ammonium chloride with said dross, heating to change the antimony, lead, arsenic and tin into chlorides and to cause the antimony and arsenic chlorides to pass off substantially completely as fume together with ammonia and water, and passing the fume into a wet scrubber to condense same to form antimony and arsenic oxide and ammonium compounds, leaving the lead chloride substantially undistilled together with some tin chloride.

11. A process for treating antimony and lead dross which comprises, combining the dross with an ammonium halide, heating to distill the antimony halide from the lead halide together with ammonia and water as a mixed fume, and condensing the fume to form a solution of ammonium halide, ammonia and antimony oxide, recovering the antimony oxide, and adding the remaining solution to the undistilled mass containing lead halide to precipitate the lead.

THOMAS R. JONES.